United States Patent Office 3,088,347
Patented May 7, 1963

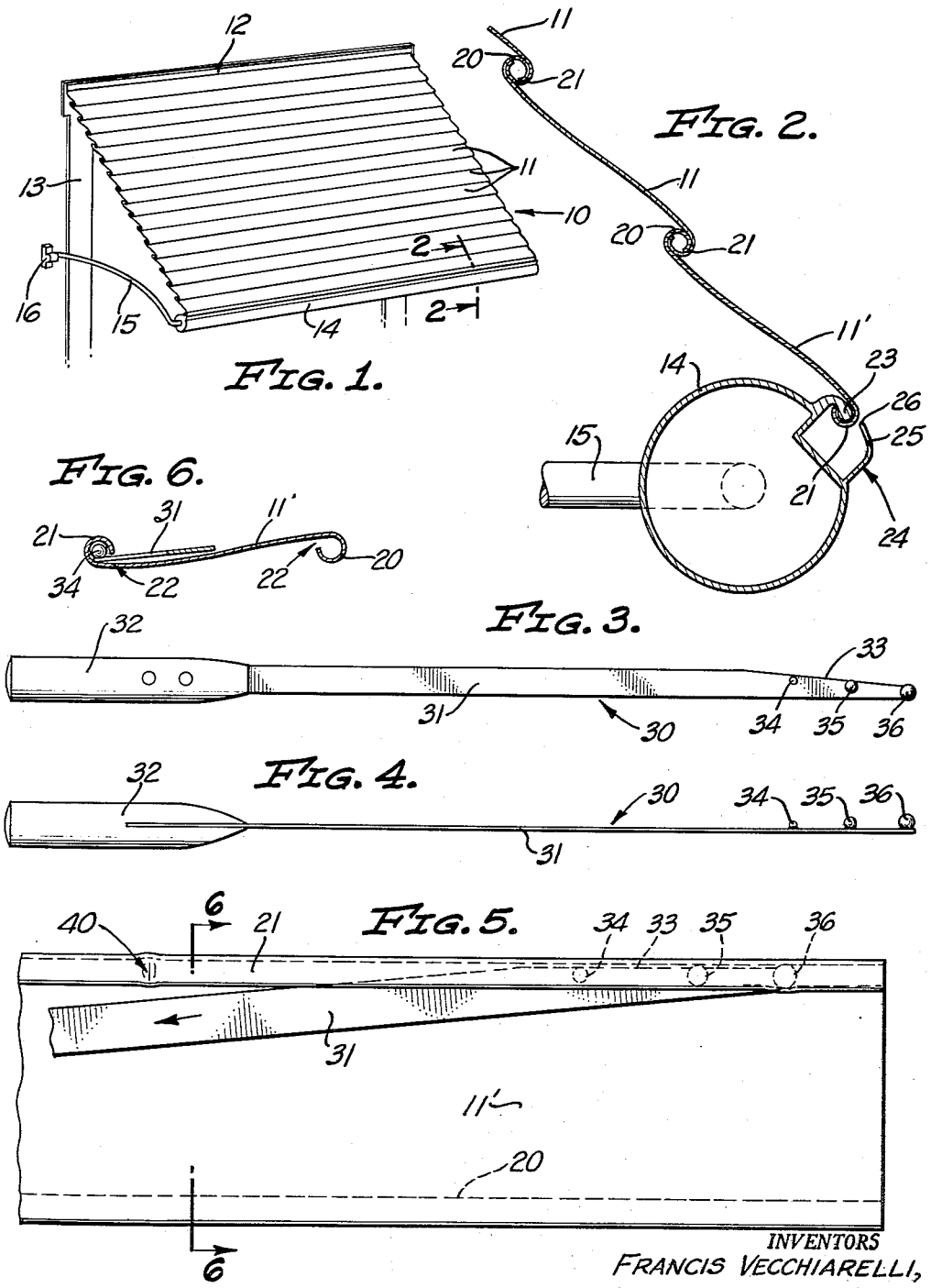

3,088,347
BEAD SIZING TOOL
Francis Vechiarelli, River Edge, N.J., and Harold R. Rudow, Arlington, Calif., assignors to National Distillers and Chemical Corporation, a corporation of Virginia
Filed July 20, 1961, Ser. No. 125,553
3 Claims. (Cl. 81—15)

The present invention relates generally to forming and sizing tools for use with sheet metal, and more particularly to a tool for sizing the rolled bead that is formed along the lower edge of the bottom slat of a roll-up awning, to prepare the same for sliding engagement by a companionate lip, or bulb, provided on the roller tube for attaching the awning canopy thereto.

The roll-up awning, as presently constructed, comprises a flexible canopy consisting of a plurality of narrow sheet metal slats arranged side by side and hinged together along their adjoining edges. Each slat is provided along its edges with oppositely facing, cylindrically curved beads, which interfit with the beads of the adjoining slats. The top slat of the canopy is attached to a flashing member on the window frame, or building wall, while the bottom slat is attached to a spring-wound roller tube, which is carried between the outer ends of two radius arms. When the radius arms are swung back against the side of the building, the flexible awning canopy is rolled up onto the roller tube, thereby retracting the awning when it is not required.

The bottom slat is customarily attached to the roller tube by means of a longitudinally extending lip, or bulb, on the tube, which is inserted endwise into the lower bead of the slat. To ensure a tight connection that will not pull loose under careless handling of the awning, or severe winds, the lip on the roller tube and the bead of the bottom slat are designed to fit snugly with respect to one another when the two parts are within normal dimensional tolerances. However, it is not uncommon for the bead to be near the lower end of the manufacturing tolerances, while the lip on the roller tube is near the upper end of the tolerances, with the result that the lip fits so snugly within the bead as to prevent relative sliding movement therebetween. Another frequent occurrence is that the bead will be flattened or dented, due to mishandling, which causes an interference fit between the parts that prevents free sliding movement therebetween.

The primary object of the present invention is to provide a simple, manually operated hand tool for quickly and easily sizing the bottom bead of the end slat, so as to open the bead to the exact size for snug sliding engagement with the lip of the roller tube.

Another object of the invention is to provide a tool that will reform a damaged bead so as to restore the same to its original cylindrical curvature, with the inside diameter correctly sized to receive the lip of the roller tube.

A further object is to provide a hand tool of the class described which can be used on the outer bead of the bottom slat of an assembled roll-up awning canopy, without necessitating removal of the bottom slat from the canopy.

Still another object of the invention is to provide a hand tool for sizing and reforming the bead of a roll-up awning slat, which is simple and inexpensive to manufacture, and extremely easy to use.

These and other objects and advantages of the present invention will become apparent to those skilled in the art upon consideration of the following detailed description of the preferred embodiment thereof, reference being had to the accompanying drawings, wherein:

FIGURE 1 is a perspective view of a typical roll-up awning, showing the same in the extended condition;

FIGURE 2 is an enlarged fragmentary sectional view through the roller tube and adjoining slats, taken at 2—2 in FIGURE 1;

FIGURE 3 is a top plan view of a bead sizing tool embodying the principles of the present invention;

FIGURE 4 is a side elevational view of the same;

FIGURE 5 is a view showing the manner of using the tool to size and reform the bead on the bottom slat of an awning canopy, so as to prepare the same for insertion over the lip of the roller tube; and FIGURE 6 is a cross-sectional view taken at 6—6 in FIGURE 5.

FIGURE 1 of the drawings shows a typical roll-up awning, which is seen to comprise a flexible canopy 10, made up of a plurality of elongated slats 11 arranged side by side, with their adjacent edges hinged together. The top slat of the canopy 10 is attached to a flashing member 12, which is mounted on the side of the building above a window frame 13, and the canopy extends downwardly and outwardly therefrom at about a 45 degree angle. The bottom slat of the canopy 10 is attached to a roller tube 14, which is rotatably supported between the outer ends of two radius arms 15, only one of which can be seen in FIGURE 1. The radius arms 15 are mounted on the side of the building by brackets 16, and are swingable vertically between the horizontally extended position shown in FIGURE 1, and an upright retracted position.

As best shown in FIGURE 2, each of the slats 11 has a cross-sectional configuration resembling a flat, elongated figure S, with oppositely facing rolled edge beads 20 and 21 provided along the longitudinal edges thereof. Both of the beads 20, 21 are generally cylindrical in cross section, with the edge of the slat spaced out from the adjacent side thereof a short distance to provide a gap at 22 (see FIGURE 6). The bead 20 of each slat is interlocked with bead 21 of the adjacent slat to form a hinge connection joining the slats together, and there is sufficient angular movement between them to allow the slats to be rolled up on the roller tube 14.

The lower bead 21 of the bottom slat 11' is engaged over a bulbous lip 23, which is formed integrally with the roller tube 14 and extends lengthwise thereof. The roller tube 14 is preferably formed as an aluminum alloy extrusion, and is cylindrical, except for a box-like formation 24 extending longitudinally along one side thereof. The lip 23 projects outwardly from the surface of the roller tube 14 and is bent approximately 90 degrees to form one corner of the box-like formation 24. Another flange 25 projects outwardly from the surface of the roller tube and is bent at an angle toward the lip 23 to form another corner of the formation. The edge 26 is spaced from the lip 23 a distance slightly less than the width of the bead 21 which prevents the bead from being pulled through the gap in the event that the bead should become disengaged from the lip.

As mentioned earlier, the bulbous lip 23 is designed to fit snugly within the bottom bead 21 of the end slat 11', and therefore the outside dimensions of the bulb are approximately the same as the inside dimensions of the bead. If both the bead 21 and lip 23 are within normal manufacturing tolerances, the parts will slide together without too much difficulty. However, if the bulbous lip 23 is slightly oversize, and the bead 21 is somewhat undersize, the parts will bind, and great difficulty will be experienced in sliding the lip endwise into the bead. The bead sizing tool of the present invention is designed to overcome this difficulty.

In FIGURES 3 and 4, the bead sizing tool is designated in its entirety by the reference numeral 30, and comprises a long, thin, flat blade 31 of spring steel or the like, having a handle 32 at one end thereof. At its other end, the blade 31 is cut back at a slight angle on one edge to form an inclined edge portion 33, and attached to one side of the blade in a line parallel to the edge portion 33 and closely adjacent thereto, are sizing balls 34, 35 and 36, of graduated diameters. The sizing balls may be secured to the blade 31 in any suitable manner, as by brazing or soldering, and while we have shown three sizing balls attached to the blade, it will be understood that they might be fewer or more in number. The balls 34, 35 and 36 are arranged in order of increasing diameters, from the smallest ball 34 at the end toward the handle 32, to the largest ball 36 at the outer extremity of the blade. The smallest ball 34 serves as a pilot to guide the other balls along the bead, and its diameter is smaller than the inside diameter of any bead 21 which might be used to make a roll-up awning. The largest ball 36 is of a diameter such that allowing for spring-back of the metal, the bead 21 will be expanded by passage of the ball 36 to the exact size to fit the bulbous lip 23. The center ball 35 is of a diameter intermediate the diameters of the outer balls.

The tool 30 is used in the manner shown in FIGURES 5 and 6. Slat 11' is turned so that bead 21 faces upwardly and the blade 31 is laid flat on the top surface of the slat at the right-hand end thereof, with the sizing balls 34, 35 and 36 lined up with the bead, and the blade 31 extending through the gap 22 between the edge of the slat and the adjoining side thereof. The tool is then drawn to the left, pulling the balls 34, 35, 36 through the bead from one end thereof to the other. The smaller balls 34 and 35 serve primarily to guide the larger ball 36 along the bead, while the latter sizes the bead and reforms any portions that have been deformed. For example, in FIGURE 5, the bead 21 is shown with a dented or flattened portion at 40. This flattened portion 40 is pushed out to the original cylindrical curvature by the sizing balls 34, 35 and 36, which engage it successively, and each ball, in turn, enlarges and rounds out the bead to the extent of its respective diameter. After drawing the sizing balls through the bead 21, the latter is inserted over the bulbous lip 23 on the roller 14 by sliding the lip endwise into the bead.

While we have shown and described in considerable detail what we believe to be the preferred embodiment of our invention, it will be understood by those skilled in the art that various changes may be made in the shape and arrangement of the several parts without departing from the broad scope of the invention as defined in the following claims.

We claim:

1. A bead sizing tool for sizing and reforming a rolled bead along one edge of a sheet metal slat, said bead being cylindrically curved and having a gap between the edge of the slat and the adjacent side thereof, said tool comprising, in combination, a thin flat blade adapted to be inserted through said gap so that one end thereof lies within said bead while the other end is outside of the bead, sizing means comprising a ball of slightly larger diameter than the original inside diameter of said bead mounted on the top side of said blade at one end for slidably engaging the inner surface of the bead to enlarge the diameter of the same when said tool is drawn from one end of said slat to the other, pilot means also mounted on the top side of said blade ahead of said ball to slidably engage the inner surface of said bead and guide said ball along the length thereof and handle means on said other end of said blade.

2. A bead sizing tool as defined in claim 1, wherein said sizing means comprises a plurality of aligned balls of graduated diameters, the smallest diameter ball being disposed in the lead, and the largest diameter ball being disposed at the trailing end, said largest diameter ball being of slightly larger diameter than the inside diameter of said bead.

3. A bead sizing tool for sizing and reforming a rolled bead along one edge of a sheet metal slat, said bead being cylindrically curved and having a gap between the edge of the slat and adjacent side thereof, said tool comprising an elongated, flat blade of spring metal having a handle at one end thereof, the other end of said blade being cut away at a slight angle to the longitudinal axis of the blade so as to provide an inclined section which lies parallel to the longitudinal axis of said bead when said other end is inserted through said gap into the inside of the bead, and a plurality of balls of graduated diameters attached to the top side of said blade closely adjacent said inclined edge section and in a line parallel thereto, said balls being spaced apart along said line and disposed with the smallest ball at the end of said line adjacent said handle, the largest ball being disposed at the other end of said line, said smallest ball being smaller in diameter than the inside diameter of said bead, and said largest ball being larger in diameter than the inside diameter of the bead, whereby when said tool is drawn along said slat from one end thereof to the other, the smaller of said balls serve to guide the larger ball along the length of said bead, and said largest ball reforms and expands said bead to a predetermined diameter.

References Cited in the file of this patent
UNITED STATES PATENTS 2,577,382    Straight _____ Dec. 4, 1951
3,004,327    Keith et al. _____ Oct. 17, 1961